US009848184B2

(12) United States Patent
Chavez et al.

(10) Patent No.: US 9,848,184 B2
(45) Date of Patent: *Dec. 19, 2017

(54) STEREOSCOPIC DISPLAY SYSTEM USING LIGHT FIELD TYPE DATA

(71) Applicant: zSpace, Inc., Sunnyvale, CA (US)

(72) Inventors: David A. Chavez, San Jose, CA (US); Bruce J. Bell, San Jose, CA (US); Alexandre R. Lelievre, Hollywood, CA (US); Jerome C. Tu, Saratoga, CA (US); Christopher W. Sherman, Leesburg, VA (US); Robert D. Kalnins, San Jose, CA (US); Jonathan J. Hosenpud, San Francisco, CA (US); Francisco Lopez-Fresquet, Boulder Creek, CA (US); Clifford S. Champion, San Jose, CA (US); Arthur L. Berman, San Jose, CA (US)

(73) Assignee: zSpace, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/407,028

(22) Filed: Jan. 16, 2017

(65) Prior Publication Data

US 2017/0127051 A1    May 4, 2017

Related U.S. Application Data

(63) Continuation of application No. 14/882,989, filed on Oct. 14, 2015, now Pat. No. 9,549,174.

(51) Int. Cl.
*H04N 13/04* (2006.01)
*H04N 5/247* (2006.01)
(Continued)

(52) U.S. Cl.
CPC .......... *H04N 13/0429* (2013.01); *G06T 3/40* (2013.01); *H04N 5/247* (2013.01); *H04N 13/0484* (2013.01); *G06T 19/006* (2013.01)

(58) Field of Classification Search
CPC .................................................. H04N 13/0429
See application file for complete search history.

(56) References Cited

U.S. PATENT DOCUMENTS 6,097,394 A    8/2000  Levoy
8,289,440 B2   10/2012 Knight
(Continued)

FOREIGN PATENT DOCUMENTS

WO    2013163468 A1    10/2013

OTHER PUBLICATIONS

Yang, Jason C. et al.—"A Real-Time Distributed Light Field Camera"—Eurographics Workshop on Rendering, 2002, pp. 1-10; The Eurographics Association (10 pages).
(Continued)

*Primary Examiner* — James Pontius
(74) *Attorney, Agent, or Firm* — Meyertons Hood Kivlin Kowert & Goetzel, P.C.; Jeffery C. Hood; Brian E. Moore (57) ABSTRACT

Systems and methods for a head tracked stereoscopic display system that uses light field type data may include receiving light field type data corresponding to a scene. The stereoscopic display system may track a user's head. Using the received light field type data and the head tracking, the system may generate three dimensional (3D) virtual content that corresponds to a virtual representation of the scene. The stereoscopic display system may then present the 3D virtual content to a user. The stereoscopic display system may present a left eye perspective image and a right eye perspective image of the scene to the user based on the position and orientation of the user's head. The images presented to
(Continued)

the user may be updated based on a change in the position or the orientation of the user's head or based on receiving user input.

19 Claims, 7 Drawing Sheets

(51) Int. Cl.
*G06T 3/40* (2006.01)
*G06T 19/00* (2011.01)

(56) References Cited

U.S. PATENT DOCUMENTS

| | | | |
|---|---|---|---|
| 8,432,436 B2 | 4/2013 | Debevec | |
| 2004/0114807 A1 | 6/2004 | Lelescu | |
| 2013/0346168 A1* | 12/2013 | Zhou | G06F 1/163 |
| | | | 705/14.4 |
| 2014/0092281 A1 | 4/2014 | Nisenzon | |
| 2014/0132715 A1* | 5/2014 | Raghoebardayal | G06T 17/00 |
| | | | 348/43 |
| 2015/0116316 A1* | 4/2015 | Fitzgerald | G02B 27/01 |
| | | | 345/419 |

OTHER PUBLICATIONS

Wikipedia Website, "Light-field camera", retrieved Jan. 16, 2017 from <https://en.wikipedia.org/wiki/Light-field_camera> (5 pages).

Kurke, Tom—"Light Field Cameras for 3D Imaging"—Dec. 16, 2013—retrieved Jan. 16, 2017 from <http://3dsolver.com/light-field-cameras-for-3d-imaging/> (7 pages).

Website: "Lightfield-forum.com"—Jul. 2013—retrieved Jan. 16, 2017 from <http://lightfield-forum.com/what-is-the-lightfield/> (2 pages).

Raytrix—"Light Field Camera Technology"—Jul. 2015—retrieved Jan. 16, 2017 from <https://www.raytrix.de/technologie/> (15 pages).

* cited by examiner

FIG. 10

STEREOSCOPIC DISPLAY SYSTEM USING LIGHT FIELD TYPE DATA

PRIORITY DATA

This application claims benefit of priority to U.S. Provisional application Ser. No. 14/882,989, titled "A Head Tracked Stereoscopic Display System that Uses Light Field Type Data", filed Oct. 14, 2015, by David A. Chavez, Bruce J. Bell, Alexandre R. Lelievre, Jerome C. Tu, Christopher W. Sherman, Robert D. Kalnins, Jonathan J. Hosenpud, Francisco Lopez-Fresquet, Clifford S. Champion, and Arthur L. Berman, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

This disclosure relates to the field of digital display, and more particularly to configurations and applications of light field type data in the generation of virtual three dimensional (3D) content.

DESCRIPTION OF THE RELATED ART

Three dimensional (3D) displays (actually, simulated 3D, e.g., via stereo display (SD) techniques) are increasingly utilized for a variety of applications, including, for example, remote viewing, videoconferencing, video collaboration, and so forth.

Figure 1:
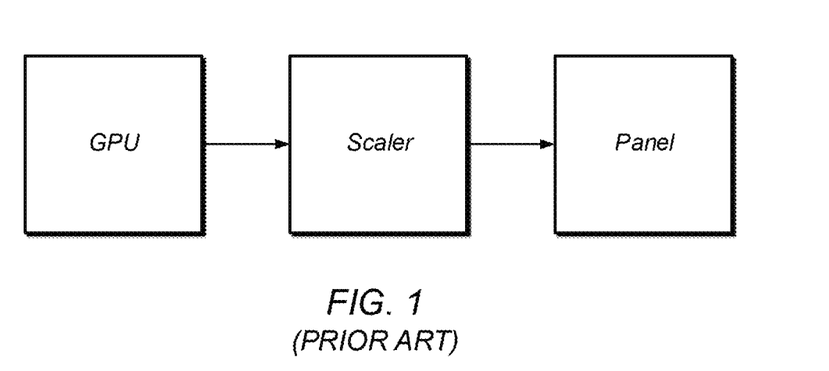
FIG. 1 illustrates a modern display chain, according to the prior art.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), but other displays are possible, and takes as input the video levels (e.g., for R, G and B) output from the scaler for each pixel, and converts them to voltages, which are then delivered to each pixel on the display. The panel itself may modify the video levels before converting them to voltages.

The video chain generally modifies the video levels in two ways that have associated shortcomings for stereo displays, specifically, gamma correction, and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, for each video frame there are two images—right and left. The right image must be delivered to only the right eye, and the left image must be delivered to only the left eye. In a time sequential stereo display, this separation of right and left images is performed in time, i.e., the left and right images are presented sequentially, and thus, contains some time-dependent element which separates these two images. There are two common architectures.

Figure 2:
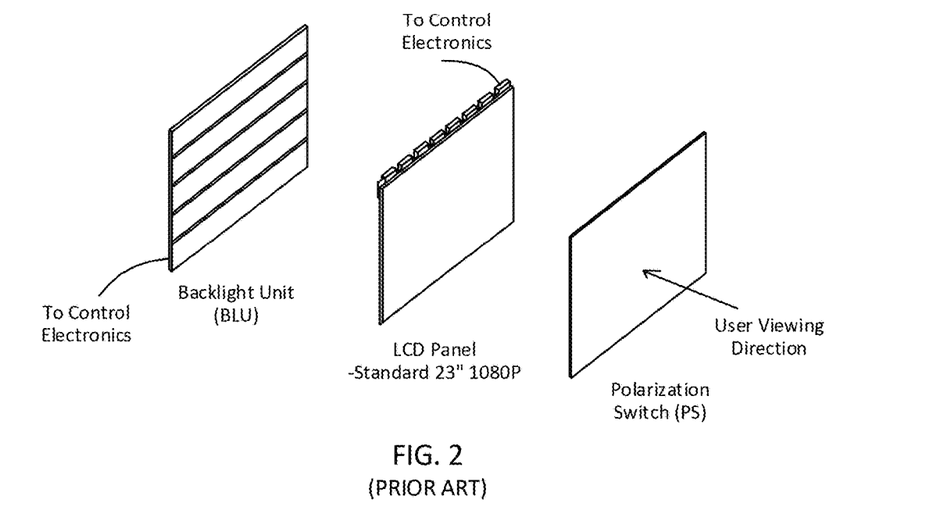
FIG. 2 illustrates an architecture that utilizes a polarization switch, according to the prior art.

The first architecture uses a device called a polarization switch (PS) which may be a distinct (separate) or integrated LC device or other technology switch, which is placed in front of the LCD panel (or any other type of imaging panel, e.g., an OLED (organic light emitting diode) panel), a plasma display, etc., or any other pixelated panel display used in a time-sequential stereo imaging system. Specifically, the PS switch may be placed between the display panel and the viewer, as shown in FIG. 2. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.,). The key feature that allows the PS to deliver the correct image to the correct eye of the viewer (i.e., the left image to the left eye and the right image to the right eye) is that the two polarization states are orthogonal to each other.

Figure 3:
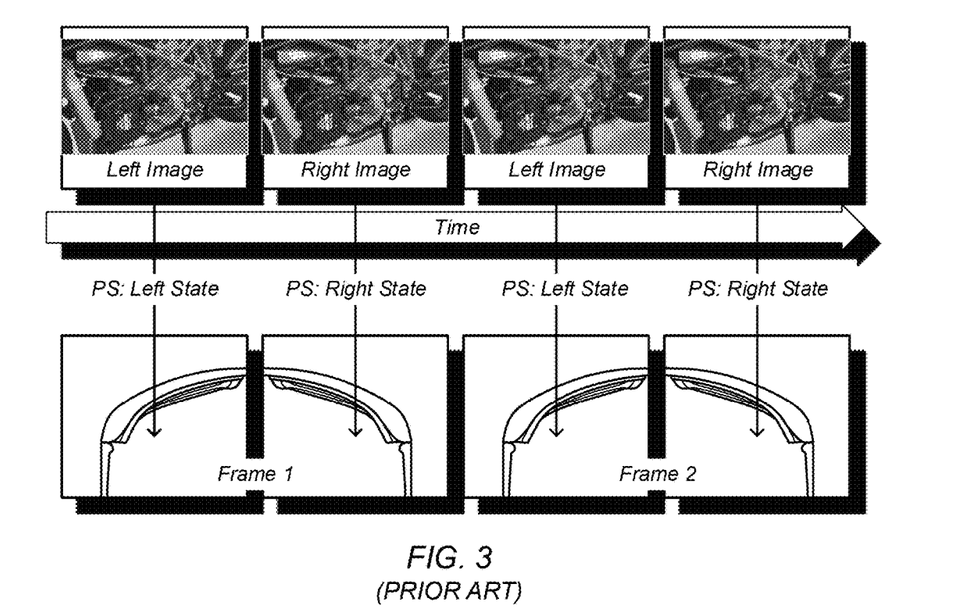
FIG. 3 illustrates a stereo effect (simulated 3D) using polarization switching between left and right views, according to the prior art.

This architecture allows achievement of the stereo effect shown in prior art FIG. 3. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as mentioned above. As FIG. 3 further shows, the system includes stereoscopic eyewear that is designed such that the left lens will only pass the left state polarization and the right lens will only pass the right state polarization. In this way, separation of the right and left images is achieved.

Figure 4:
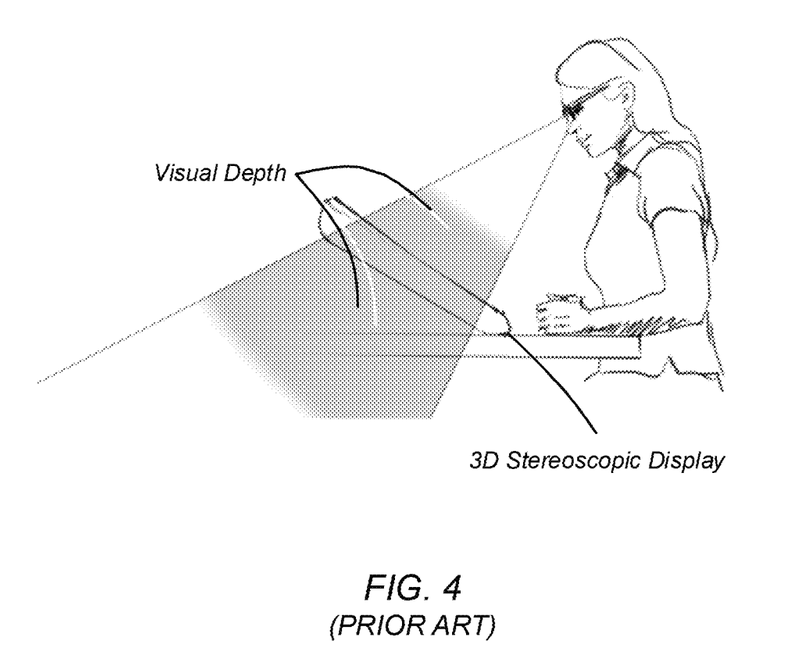
FIG. 4 illustrates perceived visual depth using a stereoscopic display, according to the prior art.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth, as shown in FIG. 4. Virtual objects may be displayed in this created 3D space, which exists both above the 3D stereoscopic display panel (i.e., negative space) and below the stereoscopic display panel (i.e., positive space).

SUMMARY

Various embodiments of a system and method for a head tracked stereoscopic display system that uses light field type data. The system may include at least one processor and one or more displays coupled to the at least one processor. In one embodiment, the system may further include a user head tracking system and a user input device. The processor may be configured to perform or implement the techniques disclosed herein. Additionally, the method may be implemented on a computer or stored as program instructions on a computer readable memory medium.

In some embodiments, a stereoscopic display system may receive light field type data corresponding to a scene. In some embodiments, the system may track the head of a user. Using the received light field type data and the tracking, the system may generate three dimensional (3D) virtual content that corresponds to a virtual representation of the scene. The system may then present the 3D virtual content to a user.

In some embodiments, the system may present a left eye perspective image and a right eye perspective image of the scene to the user based on the position and orientation of the user's head. The images presented to the user may be updated based on a change in the position or the orientation of the user's head or based on receiving user input.

The light field type data may be received from an array of cameras. In some embodiments, each camera in the array of cameras may capture light field imagery of the scene from a unique perspective. In other words, each camera may provide light field type data corresponding to a virtual representation of the scene according to the unique perspective of the camera.

In some embodiments, the stereoscopic display system may compress the light field type data by selecting a subset of the data provided by the array of cameras to present to the user. The subset of data may be used to generate the virtual representation of the scene for presentation to the user.

In some embodiments, the generated 3D virtual content may correspond to a portion of the scene corresponding to a direction of the user's viewpoint (or gaze). The direction of the user's viewpoint or an indication by the stylus may indicate an area of interest. The area or areas of interest (which may include areas proximate to the area or areas of interest) may be presented to the user in a higher resolution than other areas of the scene.

In some embodiments, the 3D virtual content may further comprise one or more graphics, wherein the one or more graphics do not correspond to the virtual representation of the scene. The one or more graphics may be generated based on input from the user, a default setting of the display system, or on an automatic determination by the stereoscopic display system.

BRIEF DESCRIPTION OF THE DRAWINGS

A better understanding of the present disclosure can be obtained when the following detailed description of the preferred embodiment is considered in conjunction with the following drawings, in which.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

This specification includes references to "one embodiment" or "an embodiment."

The appearances of the phrases "in one embodiment" or "in an embodiment" do not necessarily refer to the same embodiment. Particular features, structures, or characteristics may be combined in any suitable manner consistent with this disclosure.

Memory Medium—any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Coupled Zone—refers to a physical volume in which the user of a 3D stereoscopic display can view 3D content within the human eye's natural depth of field. As shown in FIG. 4, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers the display of a 3D object, or content, on a two dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a technique to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking device (which is identifying and tracking the user's view) identifies the position/orientation of the user's view, and this information is then correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45 degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z coordinates within a defined space. The position may be relative or absolute, as desired. Position may also include yaw, pitch, and roll information, e.g., when defining the orientation of a viewpoint.

Stylus—a peripheral device or element such as a handheld device, handheld pen device, handheld pointing device, hand, finger, glove, or any object used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including." As used in the appended claims, this term does not foreclose additional elements, structure, or steps. Consider a claim that recites: "A system comprising a display . . . ": such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

FIGS. 5-9 Exemplary System

Figure 5:
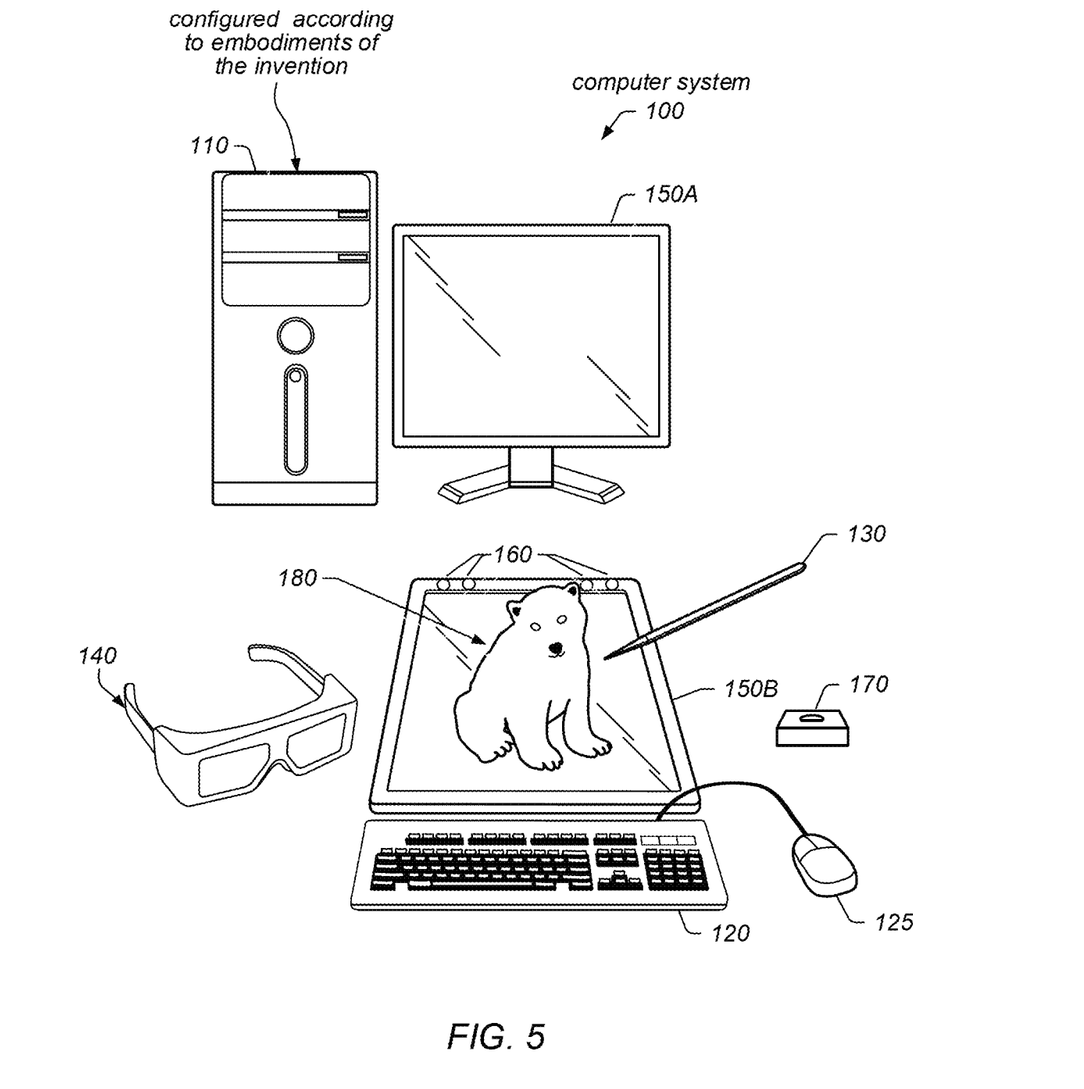
FIG. 5 illustrates a 3D stereoscopic display system configured according to some embodiments.
Figure 6:
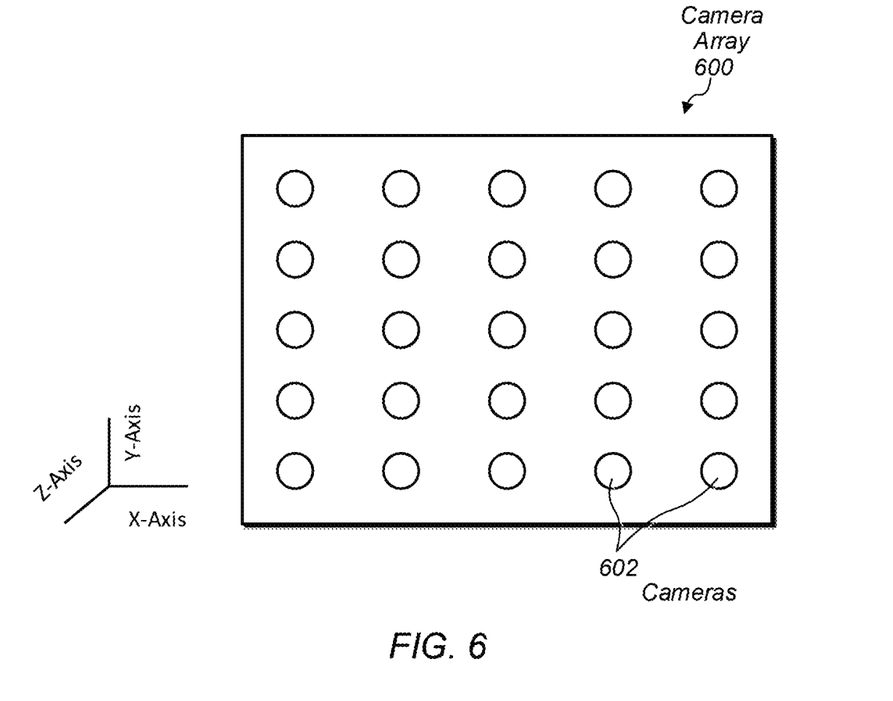
FIG. 6 illustrates an array of cameras according to some embodiments.

FIG. 5 illustrates an exemplary system configured to implement various embodiments of the techniques described below.

In the exemplary embodiment of FIG. 5, computer system 100 may include chassis 110, display 150A and display 150B (which may collectively be referred to as display 150 or "at least one display" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110 may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. Additionally, the memory medium may store operating system software, as well as other software for operation of the computer system. Various embodiments further include receiving or storing instructions and/or data implemented in accordance with the foregoing description upon a carrier medium.

As indicated above, the computer system 100 may be configured to display a three dimensional (3D) scene (e.g., via stereoscopic images), or 3D content, such as scene 180, using the display 150A and/or the display 150B. The computer system 100 may also be configured to display a "view" of the 3D scene using the display 150A, the display 150B, and/or another display, as described in more detail below. The "view" of the 3D scene, or content, may refer to a displayed a portion of the 3D scene from a viewpoint within the 3D scene. A viewpoint within the 3D scene may be referred to as a "virtual viewpoint". The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 5 is exemplary only, and other numbers of displays are also envisioned. For example, the computer system 100 may include only a single display or more than two displays, or the displays may be arranged in different manners than shown. In this particular embodiment, the display 150A is configured as a vertical display (which may be perpendicular to a user's line of sight) and the display 150B is configured as a horizontal display (which is parallel or oblique to a user's line of sight). The vertical display 150A may be used (e.g., via instructions sent by a graphics engine executing in the chassis 110) to provide images which are presented according to a vertical (or central) perspective and the display 150B may be used (e.g., via instructions sent by a graphics engine executing in the chassis 110) to provide images which are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D since the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100. For example, eyewear 140 may provide information (e.g., position, orientation, etc.) that is usable to determine the position and orientation of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position and/or orientation data suitable for the head tracking. The input device(s), such as a keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position/orientation of the display(s) 150 and the point of view of the user may be used to map a portion of the virtual space to the physical space of the system 100. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a stylus) or simply the user's hands may be used to directly interact with virtual objects of the 3D scene (via the viewed projected objects). Such direct interaction may be possible with "open space" portions of the 3D scene. Thus, at least a portion of the 3D scene may be presented in this "open space," which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is not in "open space." Thus, "open space" refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, "open space" may be considered to be a "hands-on volume" as opposed to an "inner-volume," which may be under or behind the surface of the display(s), and thus not accessible. Thus, the user may interact with virtual objects in the open space because they are proximate to the user's own physical space. Said another way, the inner volume is located behind (or under) the viewing surface, and so presented objects appear to be located inside (or on the back side of) the physical viewing device. Thus, objects of the 3D scene presented within the inner volume do not share the same physical space with the user and the objects therefore cannot be directly and physically manipulated by hands or hand-held tools such as user input device 130. Rather, they may be manipulated indirectly, e.g., via a computer mouse, a joystick, or virtual representations of hands, handheld tools, or a stylus.

Figure 10:
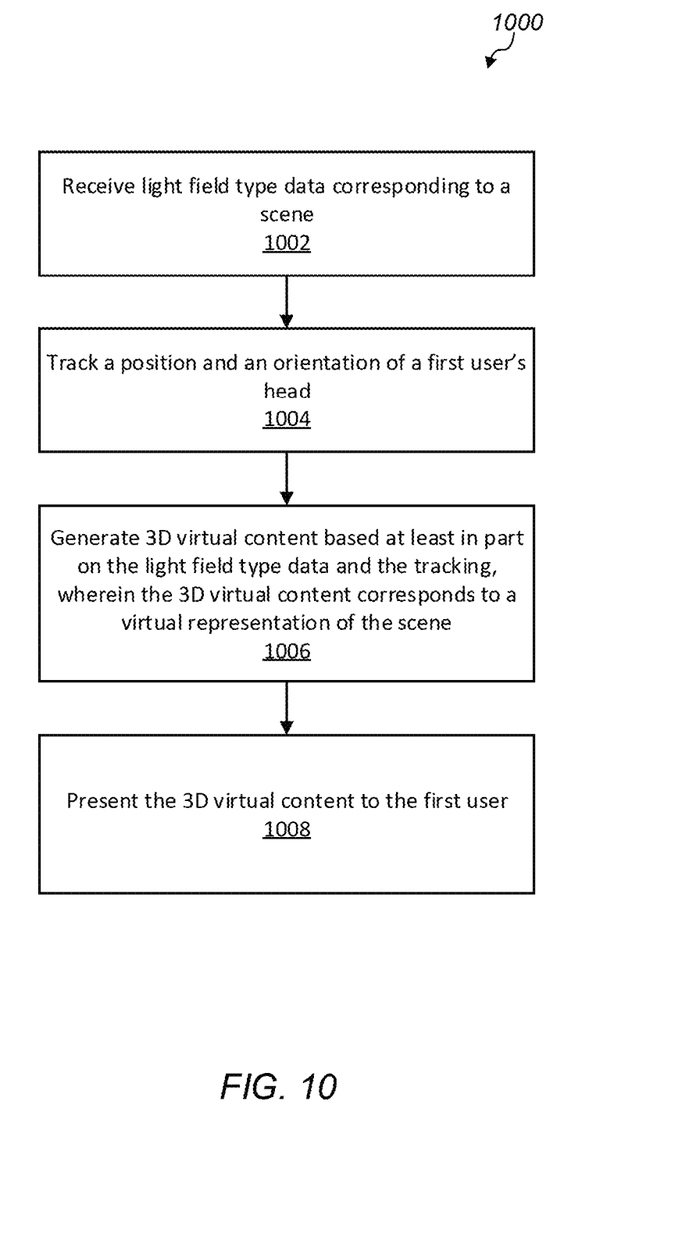
FIG. 10 illustrates a flow chart of a method for using light field type data in a head tracked stereoscopic display system according to some embodiments.

Note, however, that embodiments are contemplated in which the 3D scene may be presented without "open space" or "hand-on volume." In other words, the entire 3D scene may be presented in the "inner-volume." In such embodiments, the user may manipulate input device 130 which may correspond to a virtual input device. In other words, input device 130 may be rendered as part of the 3D scene and manipulations of input device 130 may be mapped to corresponding manipulations of the virtual input device. In some embodiments, system 100 may include one or more sensors 160. The one or more sensors 160 may be included in a point of view (POV) tracking system. FIG. 10 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100, track a user's movement, or track a user's head or eyes, among other contemplated functions. In one embodiment, cameras 160 may track a position and/or an orientation of user input device 130. The information regarding the position and/or orientation of the user input device 130 provided by the one or more sensors 160 may be used in conjunction with other positional information of the system (e.g., an accelerometer and/or gyroscope within the stylus itself) to perform more precise 3D tracking of the stylus 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100 may also include a caddy 170 to store user input device 130. Caddy 170 may also be used to calibrate the orientation of the stylus to a known roll, pitch, and yaw, and so may be in a fixed position relative to cameras 160.

In one embodiment, the system 100 may be configured to couple to a network, such as a wide area network, via an input. The input may be configured to receive image data over the network from a system similar to system 100. In other embodiments, a POV tracking system may include cameras 160. Cameras 160 may be configured to provide visual information regarding a user such that a POV, e.g., the position and orientation, of the user may be determined. However, it should be noted that any type of various POV tracking techniques or devices may be used as desired. Note that as used herein, point of view (POV) of a user refers to the perspective or POV from which a user optically views an object or image, i.e., a user's visual POV, and thus is defined with respect to the display device of the system. In some embodiments, the POV may be a 6 degree of freedom (6 DOF) POV, e.g., three position coordinates and three orientation coordinates, although any POV may be used as desired, e.g., three position coordinates and two or three orientation coordinates, and so forth.

Note that in some embodiments, the POV tracking system may rely at least in part on the components of chassis 110 to determine the POV, e.g., via execution of one more programs by or on a processor or functional unit of chassis 110, although in other embodiments the POV tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a POV tracking system at a remote location. The information regarding the POV may indicate a position and/or orientation of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110 may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit or procedure or fiducial markers to ensure proper mapping of the peripheral device to the display images and proper mapping between the projected images and the virtual images stored in the memory of the chassis 110.

Thus, the system 100 may present a 3D scene which the user may interact with in real time. The system may comprise real-time electronic display(s) 150 that may present or convey perspective images in the open space, and a peripheral device 130 that may allow the user to interact with the 3D scene with hand controlled or hand-held tools. The system 100 may also include techniques to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100 is shown as including horizontal display 150B since it simulates the user's visual experience with the horizontal ground; other viewing surfaces may offer a similar 3D illusion experience. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100) may be used as desired.

As described herein, the image presented by the display of the stereoscopic display system may be derived from video or still image data captured or otherwise produced from an array of viewpoints. For example, referring to FIG. 6, camera array 600 may capture (or obtain) image data (including video data) from a plurality of cameras, such as cameras 602. Each camera 602 in camera array 600 may capture this data from a viewpoint that is unique as compared to other cameras in the camera array. Note that the camera array may extend in more than two dimensions. That is, camera array 600 may extend linearly in a first dimension (e.g., along an x-axis) and in a second dimension (e.g., along a y-axis). Alternatively, the camera array may be curved or spherical. In other words, camera array may extend in a third dimension (e.g., along a z-axis). In other words, the camera array may exist in any configuration that extends in a first, second, or third dimension. Additionally, in some embodiments, the camera array may be moved as a unit (e.g., the unit may translate and/or rotate over time) to create a camera array in an additional dimension. For example, camera array 600 may be moved over time to create a camera array in three dimensions (e.g., along the x-axis, the y-axis, and the direction of movement, such as a z-axis). In the context of this disclosure, this type of data may be referred to as light field like data or light field type data.

Figure 7:
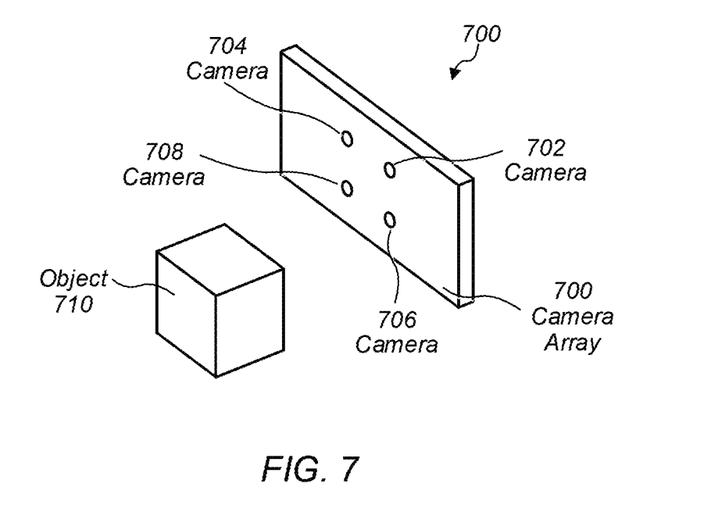
FIG. 7 illustrates an array of cameras in front of an object according to some embodiments.
Figure 8:
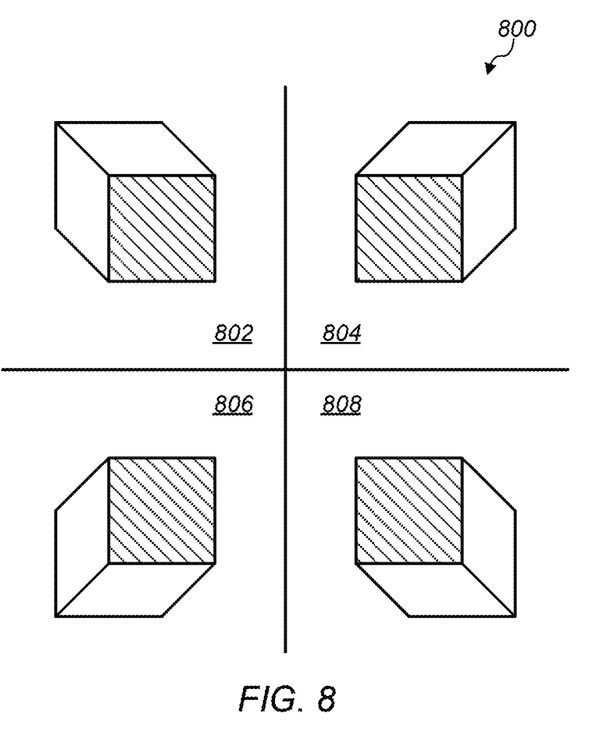
FIG. 8 illustrates an example of perspectives of each camera in a camera array according to some embodiments.

Referring now to FIG. 7, camera array 700 may be used to capture light field type data of object 710. Each camera in camera array 700 may capture image data of object 710 from a unique viewpoint (or perspective). The view of an object for a camera in a camera array may be one of the viewpoints shown in FIG. 8. That is, a camera in a camera array viewing an object (e.g., a rectangular prism) may have a slightly different view of the object depending on the position of the individual camera in the array. For example, the viewpoints illustrated in FIG. 8 may correspond to the cameras 702, 704, 706, and 708 shown in camera array 700 in FIG. 7. Each camera in camera array 700 may view the object, the rectangular prism (object 710), according to one of viewpoints 802, 804, 806, or 808 (e.g., camera 702 may view the object according to viewpoint 802, camera 704 may view the object according to viewpoint 804, camera 706 may view the object according to viewpoint 806, and camera 708 may view the object according to viewpoint 808). This light field type data may be used in stereoscopic display systems to create a virtual image of object 710.

The term light field display typically refers to an autostereoscopic 3D display system that provides motion parallax and that may be capable of supporting multiple viewers. A variety of device configurations and principles of operation have been developed for light filed type display systems. One feature common to many light field display systems is the use of an array of video projectors located behind a display screen such that each projector projects onto a section of the display screen. Each projector may project a portion of the scene obtained from an array of cameras (that is, each camera may capture a portion of the scene from a slightly different perspective for each projector to display).

In one embodiment of such light field displays, the video data projected by the array of projectors may be captured by an array of video cameras. Individual cameras in the array may be arranged in a linear array (e.g., an array of cameras extending along a single dimension) or in an X-Y array (e.g., an array of cameras extending along more than one dimension). There may be any number of cameras in such an array. The data compiled from the array of cameras may be light field type data. The light field type data may include an ordered arrangement of video or still image data captured by the array.

An additional method of presenting 3D imagery may be referred to as stereoscopic. As noted above, in stereoscopic display systems, techniques may be used to assure that a right eye perspective image is presented exclusively to the right eye of the viewer and a left eye perspective image is presented exclusively to the left eye of the viewer.

In some stereoscopic display system approaches, an image may be created on a conventional LCD. In some embodiments, located in front of the LCD (that is, between the display and a viewer of the display) is a polarization rotator that may be segmented along its horizontal axis. The viewer may wear glasses in which the lenses may be orthogonally polarized. In operation, the horizontally segmented backlight may be strobed synchronously with the segments in the polarization rotator and the presentation of the imagery on the LCD. In this way, the right eye and left eye perspective imagery may be presented time sequentially. The net effect may be that the right eye sees only the right eye perspective images and the left eye sees only the left eye perspective images. These stereoscopic display system embodiments may include head tracking.

Other stereoscopic display system approaches may use a Head Mounted Display (HMD) product. As indicated by the name, a HMD system may be worn by the viewer of the 3D content. The HMD may contain two optically separate channels such that a right optical channel may provide a right eye perspective image directly and exclusively to the viewer's right eye and the left optical channel may provide a left eye perspective image directly and exclusively to the viewer's left eye. Sensors may be included in the HMD that may allow determination of the position and orientation of the viewer's head.

With respect to these two stereoscopic display system approaches, the video or still image data input to the stereoscopic display system may include two data sets. One data set may include right eye perspective image data and the other data set may include left eye perspective data. These data sets may be derived from (or based on) one or more spatially displaced image input devices (e.g., a pair of horizontally displaced video cameras) or from a 3D computer graphics database.

A stereoscopic display system that has head tracking capability, as in the two approaches discussed above, may compute an appropriate left and right image pair corresponding to a viewer head position and orientation that is within the range of data contained in the data set. As discussed further below, light field type data may be the input to a stereoscopic display system (e.g., a head-tracked stereoscopic display system).

Figure 9:
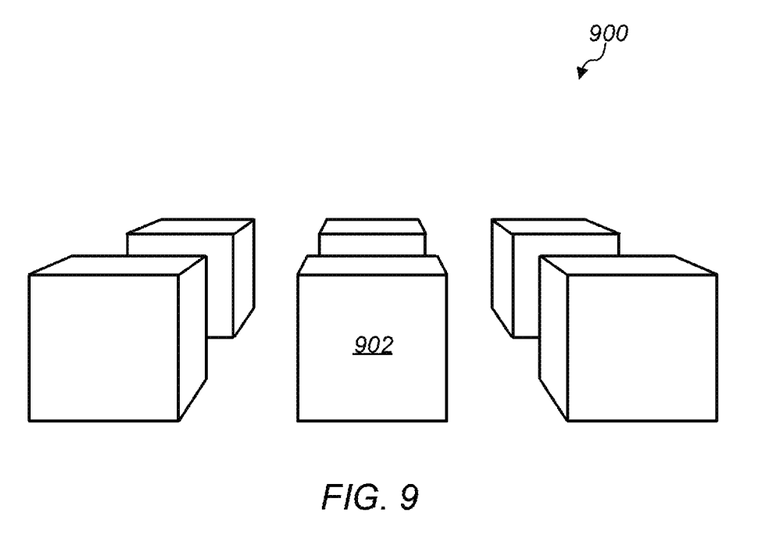
FIG. 9 illustrates a viewer's perspective of a set of objects according to some embodiments.

In some embodiments, a stereoscopic display system may derive and interpolate a right eye and a left eye perspective image from light field type data that may correspond to a perspective of a viewer (e.g., to a specific head position and orientation of the viewer). In some embodiments, the stereoscopic display system may derive and interpolate perspective images when the viewer's head position and orientation is within the range captured in the light field type data set. In some embodiments, based on light field type data, the stereoscopic display system may provide motion parallax for objects the viewer is viewing. Referring to FIG. 9, the viewer's view of an object or a set of objects, such as object 902, may change according to the viewer's perspective. That is, the viewer may perceive the objects in the viewer's field of view according to a changing perspective as the viewer's viewpoint moves.

In some embodiments, an array of cameras may capture light field imagery integrated (or embedded) in a large video "scoreboard" display (e.g., such as a display found in some sports stadiums or concert venues).

In some embodiments, light field imagery may be obtained by use of a camera (or a device with a camera feature, including a smartphone) to capture the still imagery as the basis of the light field like data sets. In some embodiments, to capture the still imagery, the camera may be moved as if capturing a panorama. Alternately, the camera may be moved about a stationary object (or about multiple stationary objects). Alternatively, the camera may be stationary while an object (or objects) of interest is rotated in front of the camera (e.g., as if the object were on a turn table). In some embodiments, the camera may capture and report position and orientation data pertaining to the camera and/or objects being captured. In some embodiments, after image capture, an arbitrary "zero" position may be assigned to a position in the captured image such that other positions may be calibrated with respect to this designated zero point. In further embodiments, the camera may move during the capture of video or panoramic imagery (e.g., the camera may be mounted so as to look through the window of a moving car).

The use of light field type data according to the present disclosure may decrease the amount of video data and, hence, the bandwidth required for transmission of data from the camera array to the viewer. Each camera in an array may capture a slightly different perspective view of the scene (e.g., each camera in camera array 700 captures a slightly different perspective view of object 704). Nonetheless, there may be at least some overlap in the views of the cameras in the camera array and, therefore, in the data (the light field type data). This overlap may provide the opportunity to remove duplications and thereby aggressively compress the data. This approach may be used for both video and still image data.

Further reductions in the amount of data transmitted to the user may be achieved according to the present disclosure. In the case of a single viewer, the stereoscopic display system may "know" the viewer's head position and orientation by sensors that may track the viewer's head. In other words, the stereoscopic display system may determine the viewer's head position and orientation based on tracking information received from sensors that may track the viewer's head. In some embodiments, the system may transmit in higher resolution a portion of the image associated with the viewer's POV or gaze direction (e.g., the viewer's area of interest). In addition, the imagery in the viewer's peripheral view may be transmitted at a lower resolution, thus reducing the amount of data transmitted and bandwidth required to transmit the data. Alternately, data can be transmitted exclusively from the cameras that are properly oriented in the viewer's direction of view. If the stereoscopic display system includes a stylus, the stylus may be used to designate an area of interest (e.g., an area other than that of the viewer's gaze). The stylus-designated area of interest may be presented in high resolution. For example, a viewer may use the stylus to designate an object in the periphery of the user's view and then move the object into the user's field of view.

In further embodiments, the system may provide a portion of a scene surrounding the viewer's gaze direction or surrounding the area designated by a stylus at a higher resolution as compared to portions of the scene away from the viewer's POV or gaze direction or from the area designated by the stylus. In this way, the system may anticipate the movement of the viewer's gaze direction or any area of interest from the current area of interest to another.

In some embodiments (e.g., when there are multiple viewers), the full video from the camera (or the camera array) may be transmitted to a server. In the case of multiple viewers, each individual viewer may draw from the server only the image or video data associated with each individual viewer's particular head position and orientation.

The use of light field type data in stereoscopic display systems may allow the integration of graphics or other still or video imagery into the captured light field imagery. In some embodiments, this integration may be done at the viewer's end of the system. For example, the integration of graphics may be accomplished in real time or as post processing. In some embodiments, the viewer may use a stylus to actively control the integrated graphics.

FIG. 10 illustrates a method for using light field type data in a head tracked stereoscopic display system according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, light field type data corresponding to a scene may be received. In some embodiments, the light field type data may be received from an array of cameras. Each camera in the array of cameras may provide light field type data corresponding to the scene from a unique perspective. In other words, each individual camera in an array of cameras may obtain a subset of the light field type data and the subset of the light field type data may correspond to a portion of the scene. In some embodiments, the light field type data may be received from a camera and the camera may capture the light field type data from a plurality of perspectives. That is, the camera may use a lenticular array to capture light field type data from a plurality of perspectives. Alternatively or in addition, the camera may move (or be moved) so as to capture the light field type data from multiple vantage points. In some embodiments, the light field type data may be received from a server storing the light field type data. The light field type data may include any combination of video data, still image data, or audio data.

At 1004, a position and an orientation of a first user's head may be tracked. In other words, a viewpoint (or a point of view or a perspective) of a first user may be tracked. In some embodiments, a left eye perspective image and a right eye perspective image from the light field type data may be determined based at least in part on the position and the orientation of the first user's head. In addition, respective positions and orientations of heads of any number of users (e.g., a second user, a third user, etc.) may be tracked.

At 1006, 3D virtual content based at least in part on the light field type data and the tracking may be generated. The 3D virtual content may correspond to a virtual representation of the scene. In some embodiments, the generated 3D virtual content may correspond to a first portion of the scene corresponding to a direction of a user's POV (point of view) (e.g., a first user's, a second user's, etc.). The 3D virtual content may include one or more graphics (e.g., cartoon graphics, speech bubbles, etc.) and the one or more graphics may not correspond to the virtual representation of the scene. The one or more graphics may be generated in response to at least one of: input from a user (e.g., a first user, a second user, etc.), a default setting of the display system, or an automatic determination. In some embodiments, the 3D virtual content may be updated in response to at least one of: a change in the position, orientation, or viewpoint of a user (e.g., a first user, a second user, etc.) or in response to receiving user input. In some embodiments, the light field type data may be compressed via selection of a subset of the array of cameras. In some embodiments, the 3D virtual content may be generated based at least in part on light field type data from the subset. Note that compressing the light field type data may reduce duplications in the light field type data.

At 1008, the 3D virtual content may be presented to the user (e.g., to a first user, to a second user, etc.). In some embodiments, the 3D virtual content presented to the first user may be different from the 3D virtual content presented to the second user. In some embodiments, the 3D virtual content presented to the first user may correspond to light field type data received from a first subset of an array of cameras and the 3D virtual content presented to the second user may correspond to light field type data received from a second subset of the array of cameras. In some embodiments, the light field type data may be received from a server. The received light field type data may correspond to a first portion and a second portion of the scene. The first portion of the scene may include the scene from the viewpoint of the first user and the second portion of the scene may include the scene from the viewpoint of the second user.

In some embodiments, the first portion of the scene may be presented to the first user in a higher resolution than portions of the scene other than the first portion of the scene (e.g., the first portion may be presented in higher resolution than the background of the scene or than portions of the scene away from (e.g., not proximate to) the first portion of the scene). In some embodiments, the first portion of the scene and portions of the scene proximate to the first portion of the scene may be presented to the first user in a higher resolution than portions of the scene other than the first portion of the scene and the portions of the scene proximate to the first portion of the scene. In some embodiments, an indication from a user (e.g., the first user, the second user, etc.) may be received. The indication may be based on input received from the user (e.g., via a stylus, a gesture from the user, or any other user input device) and may indicate a second portion of the scene (e.g., a portion of the scene distinct from the first portion of the scene). The 3D virtual content may include the first portion of the scene and the second portion of the scene presented at a higher resolution than portions of the scene other than the first portion of the scene and the second portion of the scene.

It should be noted that the above-described embodiments are exemplary only, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium that stores program instructions executable by at least one processor of a stereoscopic display system to:
   receive light field type data corresponding to a plurality of perspectives of a scene;
   compress the light field type data;
   track a position and an orientation of a first user's head;
   generate three dimensional (3D) virtual content based at least in part on the compressed light field type data and tracked position and orientation of the first user's head, wherein the 3D virtual content corresponds to a virtual representation of a scene, wherein the generated 3D virtual content corresponds to a first portion of the scene corresponding to a direction of the first user's point of view, and wherein the first portion of the scene is presented to the first user in a higher resolution than portions of the scene other than the first portion of the scene; and
   present the 3D virtual content to the first user.

2. The non-transitory computer readable memory medium of claim 1,
   wherein, to compress the light field type data, the program instructions are further executable to:
   remove one or more duplications within the light field type data.

3. The non-transitory computer readable memory medium of claim 1,
   wherein to generate 3D virtual content, the program instructions are further executable to:
   determine, based at least in part on the position and the orientation of the first user's head, a left eye perspective image and a right eye perspective image from the light field type data.

4. The non-transitory computer readable memory medium of claim 1,
   wherein the program instructions are further executable to:
   update the 3D virtual content in response to at least one of:
      a change in the position of the first user's head;
      a change in the orientation of the first user's head; or
      receiving user input.

5. The non-transitory computer readable memory medium of claim 1,
   wherein to receive light field type data, the program instructions are further executable to:
   receive light field type data from at least one of:
      an array of cameras, wherein each camera of the array of cameras provides light field type data corresponding to the scene from a unique perspective; or
      a camera, wherein the camera captures the light field type data corresponding to the scene from a plurality of perspectives.

6. The non-transitory computer readable memory medium of claim 5,
   wherein, to compress the light field type data, the program instructions are further executable to:
   compress the light field type data via selecting a subset of the array of cameras; and
   generate the 3D virtual content based at least in part on light field type data from the subset.

7. The non-transitory computer readable memory medium of claim 1,
   wherein the first portion of the scene includes portions of the scene corresponding to the direction of the first user's point of view and portions of the scene proximate to the portions of the scene corresponding to the direction of the first user's point of view.

8. The non-transitory computer readable memory medium of claim 1,
   wherein the light field type data comprises one or more of:
   video data;
   still image data; or
   audio data.

9. The non-transitory computer readable memory medium of claim 1,
   wherein the program instructions are further executable by the at least one processor of the stereoscopic display system to:
   track a position and an orientation of a second user's head; and
   present the 3D virtual content to the second user;
   wherein the 3D virtual content presented to the first user is different from the 3D virtual content presented to the second user.

10. A stereoscopic display system comprising:
    at least one processor;
    one or more displays, coupled to the at least one processor; and
    a memory in communication with to the at least one processor, wherein the memory has stored thereon instructions executable by the at least one processor to:
    receive light field type data corresponding to a plurality of perspectives of a scene;
    compress the light field type data;
    track a position and an orientation of a first user's head;
    generate three dimensional (3D) virtual content based at least in part on the compressed light field type data and tracked position and orientation of the first user's head, wherein the 3D virtual content corresponds to a virtual representation of a scene, wherein the generated 3D virtual content corresponds to a first portion of the scene corresponding to a direction of the first user's point of view, and wherein the first portion of the scene and portions of the scene proximate to the first portion of the scene are presented to the first user in a higher resolution than portions of the scene other than the first portion of the scene and the portions of the scene proximate to the first portion of the scene; and present, via the one or more displays, the 3D virtual content to the first user.

11. The stereoscopic display system of claim 10, wherein, to compress the light field type data, the program instructions are further executable to:
remove one or more duplications within the light field type data.

12. The stereoscopic display system of claim 10, wherein to generate 3D virtual content, the program instructions are further executable to:
determine, based at least in part on the position and the orientation of the first user's head, a left eye perspective image and a right eye perspective image from the light field type data.

13. The stereoscopic display system of claim 10, wherein the program instructions are further executable to:
update the 3D virtual content in response to at least one of:
a change in the position of the first user's head;
a change in the orientation of the first user's head; or
receiving user input.

14. The stereoscopic display system of claim 10, wherein to receive light field type data, the program instructions are further executable to:
receive light field type data from at least one of:
an array of cameras in communication with the memory and the at least one processor, wherein each camera of the array of cameras provides light field type data corresponding to the scene from a unique perspective; or
a camera in communication with the memory and the at least one processor, wherein the camera captures the light field type data corresponding to the scene from a plurality of perspectives.

15. The stereoscopic display system of claim 14, wherein, to compress the light field type data, the program instructions are further executable to:
compress the light field type data via selecting a subset of the array of cameras; and
generate the 3D virtual content based at least in part on light field type data from the subset.

16. A computer implemented method comprising:
a stereoscopic display system performing,
receiving, from an array of cameras, first data corresponding to a scene;
tracking a point of view of a user;
generating 3D virtual content based at least in part on the first data and the point of view, wherein the 3D virtual content corresponds to a virtual representation of the scene, wherein the generated 3D virtual content corresponds to a first portion of the scene corresponding to a direction of the point of view of the user, and wherein the first portion of the scene and portions of the scene proximate to the first portion of the scene are presented to the user in a higher resolution than portions of the scene other than the first portion of the scene and the portions of the scene proximate to the first portion of the scene; and
presenting the 3D virtual content to the user.

17. The computer implemented method of claim 16, wherein the generating 3D virtual content comprises:
determining, based at least in part on the point of view of the user, a left eye perspective image and a right eye perspective image from the first data.

18. The computer implemented method of claim 16, further comprising:
the stereoscopic display system performing,
updating the 3D virtual content in response to at least one of:
a change in the position of the first user's head;
a change in the orientation of the first user's head; or
receiving user input.

19. The computer implemented method of claim 16, wherein the first data comprises light field type data.

* * * * *